United States Patent Office 3,279,929
Patented Oct. 18, 1966

3,279,929
FIRE RETARDING COMPOSITION AND METHOD OF MAKING THE SAME
Lili Peters, Philadelphia, Pa., assignor to R. M. Hollingshead Corporation, Camden, N.J., a corporation of New Jersey
No Drawing. Filed Sept. 11, 1963, Ser. No. 308,100
3 Claims. (Cl. 106—18)

This invention relates to a fire retarding composition and to a method of making the same, and more particularly relates to an emulsion which is adapted for continuous production of fire retardant rubber.

It is an object of this invention to provide a fire retarding composition which may be continuously mixed and afterwards precipitated in alum along with latex, or which can be deposited in situ upon textile or other materials with uniformity and with excellent control. Another object of this invention is to provide a latex or rubber-containing emulsion for producing fire retardant rubber, which emulsion is highly stable under the conditions in which it is used, but which can be coagulated readily with alum.

Other objects and advantages of this invention, including the simplicity and the economy of the same and its wide adaptability to the great variety of purposes, will further become apparent hereinafter.

In accordance with this invention, an emulsion is prepared which consists essentially of a brominated phosphate, emulsified in a mixture containinings a dinonyl phenol phosphate ester, potassium oleate and water. The proportions of ingredients in accordance with this invention are critical, and comprise by weight 30–50% brominated phosphate, 3–8% dinonyl phenol phosphate ester, 3–10% potassium oleate and 30–60% water.

The brominated phosphate in accordance with this invention is tris (2,3-dibromopropyl) phosphate which has the following formula:

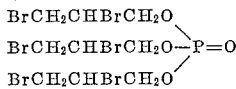

The dinonyl phenol phosphate ester has the general formula:

$$[R-O-(CH_2CH_2O)_n]_2=P=O \quad OH$$

where $n$ is an integer of from about 4 to about 8, and where R represents dinonyl phenol. Particularly, the formula of the dinonyl phenol phosphate ester is:

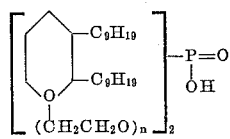

where $n$ is an integer of from about 4 to about 8.

In addition to the utilization of the di ester, it is possible to use a mixture of the di ester with the mono ester, but the mixture must contain at least 50% by weight of the di ester. The mono ester has the formula:

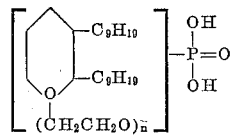

where $n$ is an integer of from about 4 to about 8.

The emulsions in accordance with this invention are readily formulated by simply forming a mixture of the phosphate ester and of the dinonyl phenol polyoxyalkylene phosphate ester, and mixing it with specific proportions of potassium oleate and water. The product is a highly stable emulsion which is readily dispersible in water. This is a highly important and advantageous feature of the invention since other emulsions of the brominated phosphate have a tendency toward separation of oil when added to water.

Emulsions in accordance with this invention are readily useable in the cold and have a pH in the range of about 6–9, and thus are compatible with latex and do not tend to coagulate the latex. These emulsions are stable but break readily when alum is added to mixtures containing the emulsions and latex. Further, emulsions in accordance with this invention have a proper viscosity for pumping, and do not involve any volatile or dangerous solvent such as toluene and the like.

It is of particular advantage that the potassium oleate may be added to the solution in the cold, by adding first about 5% by weight of pure oleic acid to the mix, and then adding a solution comprising about 45% of potassium hydroxide, in an amount of 2½% by weight of the solution.

In place of potassium oleate, sodium oleate may be used in limited quantities, but sodium oleate makes a harder soap at room temperature.

It is important to observe that the emulsions produced in accordance with this invention are readily coagulated with sodium or potassium alum when applied to textiles or the like, which sets the brominated phosphate ester. Washing with water eliminates any emulsifiers which would tend to support fire if they were allowed to be present in the finished material containing the fire retardant.

The following specific examples are illustrative of compositions which are particularly effective in accordance with this invention.

*Examples 1–9*

| Ingredient | 1 | 2 | 3 | 4 | 5 | 6 | 7 | 8 | 9 |
|---|---|---|---|---|---|---|---|---|---|
| BrCH₂CHBrCH₂O—P=O (tris dibromopropyl phosphate) | 40 | 40 | 40 | 40 | 30 | 30 | 50 | 45 | 45 |
| [R—O—(CH₂CH₂O)ₙ]₂=P=O (OH) | 6 | 8 | 3 | 6 | 6 | 8 | 6 | 4 | 6 |
| Potassium Oleate | 3 | 10 | 5 | 8 | 8 | 10 | 8 | 6 | 8 |
| Water | 51 | 42 | 52 | 46 | 56 | 52 | 36 | 45 | 41 |

Example 10

A continuous roll of fabric is treated at room temperature by immersing it in an aqueous solution containing water and an emulsion produced in accordance with Example 2. The fabric is impregnated thoroughly by immersion for 5 minutes. Upon removal from the solution the fabric is passed between nip rolls to remove excess emulsion and is then treated by immersing it in a solution of potassium alum. This breaks the emulsion and precipitates the fire retardant in situ on the fabric, whereupon the fabric is then passed continuously through a series of water baths, removing excess oleate and other soluble ions. The resultant fabric exhibits excellent fire retardant properties.

Example 11

A continuously moving paper strip is immersed in an emulsion produced in accordance with Example 7, above, utilizing a processing apparatus comparable to that just referred to in Example 10. After immersion in the fire retardant emulsion the paper is treated with water and dried. The dry paper, impregnated with the brominated phosphate fire retardant composition, has excellent fire retardant properties and is substantially free of excess emulsion.

Example 12

An emulsion is prepared according to Example 3 and is continuously added to a dilute latex emulsion, rubber additives such as fillers, accelerators and the like are continuously added, and after all additives are present and thoroughly mixed, the mixture is flowed into an alum solution. This co-precipitates a crumb consisting of the latex, the fire retardant, and the other additives, after which the crumb is washed, filtered and dried, producing the solid rubber product (crumb).

Although specific terms have been used herein for the sake of clarity, it will be appreciated that this invention includes the substitution of equivalents, and the use of certain features independently of other features, all as defined in the appended claims.

The following is claimed:

1. A fire retardant emulsion consisting essentially by weight of about 30–50%

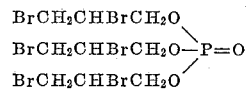

about 3–8%

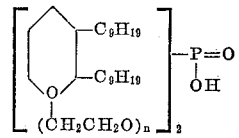

where $n$ is an integer of from about 4 to about 8, about 3–10% alkali metal oleate, and about 30–60% water.

2. The emulsion defined in claim 1 characterized by a pH of about 6–9.

3. In a method of treating a material to render it fire retardant, the steps which comprise intimately contacting the material with an emulsion as defined in claim 1, at a temperature of about 70–80° F., and then coagulating the emulsion in situ by immersing said material in an alkali metal alum solution.

References Cited by the Examiner
UNITED STATES PATENTS 3,046,297   7/1962   Overbeek et al. _____ 252—8.1
3,056,744  10/1962   Copes et al. _____ 260—951

ALEXANDER H. BRODMERKEL, *Primary Examiner.*

L. HAYES, *Assistant Examiner.*